United States Patent
Pot

(10) Patent No.: US 9,203,130 B2
(45) Date of Patent: Dec. 1, 2015

(54) RF FILTER HOUSING

(75) Inventor: Abel Frans Pot, Brunssum (NL)

(73) Assignee: DSM IP ASSETS B.V., Heerlen (NL)

( * ) Notice: Subject to any disclaimer, the term of this patent is extended or adjusted under 35 U.S.C. 154(b) by 407 days.

(21) Appl. No.: 13/504,267

(22) PCT Filed: Nov. 7, 2010

(86) PCT No.: PCT/EP2010/067639
§ 371 (c)(1),
(2), (4) Date: Apr. 26, 2012

(87) PCT Pub. No.: WO2011/061211
PCT Pub. Date: May 26, 2011

(65) Prior Publication Data
US 2012/0225305 A1    Sep. 6, 2012

(30) Foreign Application Priority Data

Nov. 18, 2009  (EP) ..................... 09176285

(51) Int. Cl.
| | |
|---|---|
| *B32B 15/04* | (2006.01) |
| *B32B 17/04* | (2006.01) |
| *H01P 1/20* | (2006.01) |
| *H01P 1/203* | (2006.01) |
| *B32B 15/09* | (2006.01) |
| *H01P 11/00* | (2006.01) |

(52) U.S. Cl.
CPC ................ *H01P 1/203* (2013.01); *B32B 15/09* (2013.01); *B32B 17/04* (2013.01); *H01P 1/20* (2013.01); *H01P 11/007* (2013.01)

(58) Field of Classification Search
None
See application file for complete search history.

(56) References Cited

U.S. PATENT DOCUMENTS

| | | | |
|---|---|---|---|
| 4,434,276 A * | 2/1984 | Horlbeck et al. | ............. 525/437 |
| 2007/0296534 A1 | 12/2007 | Carastro et al. | |
| 2008/0246192 A1 | 10/2008 | Kim et al. | |
| 2009/0280281 A1 | 11/2009 | Hsu et al. | |

FOREIGN PATENT DOCUMENTS

| | | |
|---|---|---|
| EP | 1270671 | 1/2003 |
| EP | 1544938 | 6/2005 |
| EP | 2086049 | 8/2009 |
| WO | WO 2009045431 A1 * | 4/2009 |

OTHER PUBLICATIONS

International Search Report for PCT/EP2010/067639 mailed Mar. 2, 2011.

* cited by examiner

*Primary Examiner* — Ramsey Zacharia
(74) *Attorney, Agent, or Firm* — Nixon & Vanderhye P.C.

(57) ABSTRACT

Component manufactured of a polymer composition, which component has been plated with electrical conductive material to provide EMI shielding and which polymer composition contains (a) polyethylene terephthalate (b) glass fibers. The component preferably is a RF filter housing, more preferably a RF filter housing for use in base station for mobile telephone.

8 Claims, No Drawings

RF FILTER HOUSING

This application is the U.S. national phase of International Application No. PCT/EP2010/067639 filed 17 Nov. 2010 which designated the U.S. and claims priority to EP 09176285.6 filed 18 Nov. 2009, the entire contents of each of which are hereby incorporated by reference.

The invention relates to a component of an electronic installation, more particular a component of an electronic installation for outdoor use, which component has been manufactured of a polymer composition and has been plated with an electrical conductive material.

Even more particular the invention relates to a RF filter housing manufactured of a polymer composition, which housing has been plated with electrical conductive material to provide EMI shielding. Radio frequency (RF) filters represent a class of electronic filters, designed to operate on signals in the megahertz to gigahertz frequency ranges (medium frequency to extremely high frequency). This frequency range is the range used by most broadcast radio, television, wireless communication (mobile telephones also called cell phones, Wi-Fi, etc), and thus most RF devices will include some kind of filtering on the signals transmitted or received. A good example is RF filters used in base stations for mobile telephone.

A demand on the components is that they maintain their function, under all kind of conditions. For the RF filter housing it is important that the housing shields for electro-magnetic interferences (EMI). The inferences cause a disturbance that affects the electrical circuit due to for example electromagnetic conduction or electromagnetic radiation from an external source. The disturbance may interrupt, obstruct or otherwise degrade or limit the effective performance of the circuit. Examples of external sources causing the disturbance include electric or electronic equipment or even natural sources, for example the sun or the Northern Lights.

Housings for RF filters are traditionally made of metal such as alumina.

A problem of such housings is that their fabrication process is complicated and laborious. The housing must be cast at high temperature and processed to remove flash and to drill in holes for taps etc and it must be cut and sanded to produce flat locking surfaces. In some occasions it is even necessary to drill the housing from a solid block of material, for example if housings of barium oxide or zirconium oxide have to be produced. Examples of RF filters and housings of RF filters are given in U.S. Pat. No. 4,278,957, EP-A-1544938-A and EP-A-1544940.

In U.S. Pat. No. 5,329,687 it was proposed to produce the housing from a glass fibre reinforced polyetherimide resin, sold under the trade name UItem®. The housing is produced by injection molding and is plated with an electrically conductive material, using vacuum metallization processes or chemical plating processes, which processes comprise chemical and/or electrochemical treatment steps, to apply often 2 or more layers of metal. The housing is plated to provide shielding against electro-magnetic interferences. Therefore it is important that the plated metal layer covers the entire surface of the housing, so it has no openings to let pass electromagnetic radiation. It is therefore also very important that the plated metal layer keeps its integrity during the service life of the housing.

The housing fulfills severe demands posed to the housing, for example by outdoor use, even in aerospace, under which conditions among others large temperature fluctuations may occur. A good example of such outdoor use is the use of the RF filters in outdoor placed cabinets for mobile telephone base stations. However polyetherimide is difficult to process, especially if it is glass fibre reinforced. Both melting point and viscosity of the polymer composition containing the polyetherimide and the glass fibres are very high, resulting in a complicated injection molding process. It is also difficult to obtain the right dimensions for the housings, which must be within narrow tolerances, in view of its application. Furthermore it is necessary to use chromium ions in the plating process of polyetherimide. This induces the risk of health problems.

Many other polymer compositions other than glass fibre reinforced polyetherimide are known that come into consideration for producing the RF filter housing, because the compositions are better processable. A problem however is to find a composition that is not only better processable, but that also shows the properties necessary to fulfill the severe demands posed to the housings. A problem that generally occurs, is that after a certain period of time the housing looses its shielding properties, probably because of ultimate failure of the metal layer plated onto the housing. Examples of polymers that were proposed in vain in this application include among others liquid crystal polymers, polycarbonate, syndiotactic polystyrene, semi-aromatic polyamides, polyamide 46, etcetera. Despite the many attempts to replace the polyetherimide composition, in the long period since the introduction thereof nobody succeeded in finding an alternative polymer composition.

Object of the present invention is to provide a component of an electronic installation, more particular a component of an electronic installation for outdoor use, which component has been manufactured of a polymer composition and has been plated with an electrical conductive material that is easier to produce than the housing of the polymer composition containing the polyetherimide, and which component keeps functioning under severe outdoor use conditions.

Surprisingly this object is obtained if the polymer composition contains:
(a) polyethylene terephthalate (PET)
(b) glass fibres.

If the component is a housing, the housing shows no ultimate failure of the metal layer disposed on the housing, even not after a long period, so that a housing is provided with a long service life. In case of a RF filter housing the RF filter functions very well within a well defined range of frequencies.

It is for example also possible that the component is an antenna, for example a dipole antenna. The antenna keeps functioning well after a long period of use. Prior art antenna's often have been produced of pure metal or of heavy metal foils that have been adhered to a substrate. These antenna's are complicated and therefore costly to produce.

The polyethylene terephthalate polymer is a polyester based on terephthalic acid and ethylene glycol as main monomeric units. The polyethylene terephthalate can also contain small amounts of other diacids, like isophtalic acid, or diols, like diethylene glycol as comonomers. Preferably the composition contains at least a polyethylene terephthalate homopolymer. A polyethylene terephthalate homopolymer is herein understood to contain less than 5 mol % of monomer units other than those of terephthalic acid and ethylene glycol. The advantage of such a homopolymer is a higher melting point and better crystallisation behaviour. More preferably the polyethylene terephthalate homopolymer contains less than 4 mol %, even more preferably less than 3 mol % and most preferably less than 2 mol % of monomer units other than those of terephthalic acid and ethylene glycol. Preferably at least 50 weight (wt) % of polyethylene terephthalate in the composition is the homopolymer, more preferably at least 90 wt. %, most preferably at least 95 wt. %.

The polyethylene terephthalate may have a relative solution viscosity (RSV, determined on a solution of 1 gram polymer in 125 grams of a 7/10 (m/m) trichlorophenol/phenol mixture at 25° C.; method based on ISO 1628-5) of from 1.50 to 2.00, preferably 1.60-1.85, and most preferably 1.65-1.80. Generally a higher RSV will result in improved strength and toughness of a composition, whereas a lower RSV promotes melt flow and crystallisation speed. With the present RSV range an optimum in performance is reached, without the need for adding impact-modifiers or flow-promoters, which is favourable for even further extending the service life of the component. In order to arrive at these RSV values, the polyethylene terephthalate may have been post-condensed in the solid state, for example by exposing the composition in granular form to an elevated temperature of up to about 10° C. below its melting point, in an inert atmosphere during several hours. Another advantage of such a solid state post-condensation is that any volatiles present in the composition, and that may affect processing behaviour of the composition or properties of a part moulded thereof, are substantially removed.

The polymer composition preferably contains a nucleating agent to enhance the crystallisation of the polyethylene terephthalate. As a nucleating agent any known nucleating agents may be used. Preferably inorganic additives like micro-talcum, or a metal-carboxylate, especially an alkali-metal-carboxylate like sodium benzoate is used. More preferably sodium benzoate is used in an amount of from about 0.05 to 0.5 mass % (based on polyethylene terephthalate).

The polymer composition that is used in component according to the invention is preferably substantially free of plasticizers, i.e. it preferably contains no additives that lower the temperature range in which crystallisation from the melt occurs. The advantage hereof is that the properties of an injection-moulded part will not change due to loss of plasticizer.

Suitable glass fibres for use in the polymer composition may have a fibre diameter of from 5 to 20 µm, preferably 8-15 µm, and most preferably 9-11 µm for optimal balance of mechanical properties and processability. The glass fibres preferably have a sizing on their surface that is compatible with polyethylene terephthalate and contains an epoxy- or amino-functional compound. Preferably the sizing contains an epoxy-functional compound. The advantage thereof is a good dispersability in polyethylene terephthalate and improved long-term mechanical properties of the polymer composition, especially fatigue behaviour.

The polymer composition may contain between 10 and 60 wt. % of glass fibres. Preferably the polymer composition contains between 30 and 50 wt. % of glass fibres. In that case the composition is very well processable by the injection moulding process and the components according to the invention keep functioning very well for an extended period of time. Most preferably between 35 and 45 wt. %.

The polyethylene terephthalate composition that is used in the process according to the invention may also contain 0-20 mass % of other fibrous or particulate mineral fillers. Preferably filler particles are used, for example talcum or kaolin, because they contribute to the stiffness of the composition without undesirably enhancing anisotropy in properties of the composition.

The polymer composition that is used in the component according to the invention may also contain the usual additives, like stabilisers, anti-oxidants, colorants, processing aids like a mould-release agent, viscosity-modifiers like a chain extension agent, impact-modifiers, etcetera.

Preferably the polymer composition contains less than 5 wt. % of the usual additives, more preferably less than 3 wt. %, most preferably less than 1 wt. %. Preferably the composition consists of the PET, the glass fibres and less than 5 wt. % of the usual additives, more preferably less than 3 wt. %, most preferably less than 1 wt. %.

The polymer composition of the component according to the invention, comprising a PET and a reinforcing fibre may be obtained by mixing or blending the various components applying known techniques. This mixing may be a 'dry' blending operation, wherein the various components are mixed below the melt processing temperatures of the PET, or a melt blending process wherein the components, optionally pre-blended, are mixed at suitable melt processing temperatures, e.g. in a single or twin screw extruder. Also a combination of dry blending and melt blending may be applied.

The component according to the invention is suitably manufactured by an injection molding process, followed by metal plating of the component obtained in that process with an electrically conductive material. This plating process may be carried out by using a vacuum metallization processes or a chemical plating process, for example a process comprising chemical and/or electrochemical treatment steps, to apply often 2 or more layers of metal.

Preferably the plating process is a so-called electroless chemical plating process, which means that for the application of the first layer or layers chemical steps are used in the plating process.

Such process preferably contains the steps of:

1) etching at least a part of the surface of the component with an alkaline solution, preferably a caustic soda solution, with a pH of at least 12, preferably at least 14, 2) etching the glass fibers by using hydrogen fluoride, 3) electroless deposition of palladium (Pd) by using a solution of a Pd complex.

4) electroless deposition of a Copper (Cu) layer by using a solution of a cupper salt complex, to a layer thickness of for example between 2 and 10 microns, followed by 5) electroless deposition of a Nickel (Ni) layer of 2-3 microns, followed by electroless deposition of a silver (Ag) layer.

It is also possible to replace step 5 by simply electroless deposition of a 2-10 micron layer of Ni or Ag.

Such plating processes are well-known to the skilled person.

The component of the electronic installation according to the invention preferably is such a component suitable for outdoor use. The component may be a housing or an antenna. Even more preferably the component is a housing of an RF filter, most preferably a housing of an RF filter for use in a base station for mobile telephone.

Good results are obtained if the housing of the RF-filter is plated at the inside of the housing. Often the housing exists of 2 or more parts. The housing may exist of a body and a cover plate or of a body and both a bottom and a cover plate.

Materials Used.

Amite AV2-390XT, a PET composition containing 50 wt. % of glass fibers (PET, 50% glass). Delivered by DSM the Netherlands.

Amite AV2-370/B, a PET composition containing 30 wt. % of glass fibers (PET, 30% glass). Delivered by DSM the Netherlands.

Akulon K224G6, PA 6 containing 30 wt. % of glass fibers (PA 30% glass).
PC, a regular unfilled polycarbonate.
Test Sample.

As test sample a box was used being in its shape representative for a RF filter housing.

The size of the box was 110×110×32 mm.
Production of Test Sample.

The test sample was produced by using an Arburg Allrounder 320 S injection moulding machine, to which machine a mould for the test sample was mounted.

For the injection moulding process standard conditions adapted to the material used were applied.
Plating of the Samples.

The inside and outside surface of the test sample was plated by a process consisting of the following steps:
1) etching of the surfaces of the test sample by contacting the surfaces with a caustic soda solution with a pH of 14, for 4 minutes at a temperature of 80° C.
2) etching of the glass fibers at the surfaces with hydrogen fluoride gas during 6 min at a temperature of 40° C.
3) activation of the surfaces of the test sample by contacting the surfaces with an aqueous solution containing 10 g/l $SnCl_2$ and 40 ml/l concentrated HCl during 2 minutes at room temperature.
4) activation of the surfaces of the test sample by contacting the surfaces with an aqueous solution containing 0.25 g/l Pd $Cl_2$ and 2.5 ml/l concentrated HCl for 1 minute at room temperature.
5) electroless deposition of a Ni layer by contacting the surfaces of the test sample with an aqueous solution of 60 ml/l EN 439E A (delivered by Enthone GmbH from Germany) and 150 ml/l EN439E B (delivered by Enthone Gmbh from Germany) for 5 min at 88° C. at a pH of 4.9.
6) electroless deposition of a silver layer by contacting the surfaces with a silver cyanide solution for 30 minutes at room temperature.

EXAMPLES 1, 2 AND COMPARATIVE EXPERIMENTS A AND B

Test samples were produced from Arnite AV2-390XT and Arnite AV2-370/B (examples 1 and 2) and PA-6 and PC (comparative experiments A and B).

The test samples were subjected to a thermal shock test by heating the samples at 200° C. for 30 minutes, followed by a rapid immersion in water of 20° C.

The samples were subjected to a humidity test by keeping the samples for 640 hours at 85° C. and 85% of relative humidity.

After that the samples were inspected on blistering of the metal layer or peeling off. Absence of these phenomena indicates a pass, the presence of which phenomena indicates a fail. The results are indicated in table 1.

TABLE 1

|  |  | Thermal shock test | Humidity test. |
|---|---|---|---|
| Example 1 | PET, 50% glass | pass | pass |
| Example 2 | PET, 30% glass | pass | pass |
| Comp. exp. A. | PA, 30% glass | fail | fail |
| Comp. exp. B. | PC | fail | pass |

The invention claimed is:

1. A radio frequency (RF) filter housing for outdoor use, wherein
the RF filter housing is formed of a polymer composition comprised of (a) polyethylene terephthalate and (b) glass fibres, and wherein
the polymer composition forming the RF filter housing is plated with an electrically conductive layer comprising a top layer of silver (Ag) to provide shielding of electromagnetic interferences (EMI) of electronic components within the housing, and wherein
the RF filter housing exhibits no blistering or peeling of the silver (Ag) layer from the polymer composition forming the RF filter housing when subjected to an atmosphere of 85° C. and 85% relative humidity for 640 hours.

2. The RF filter housing according to claim 1, wherein the polyethylene terephthalate is a polyethylene terephthalate homopolymer.

3. The RF filter housing according to claim 1, wherein the polyethylene terephthalate is post-condensed.

4. The RF filter housing according to claim 1, wherein the glass fibres are present in the polymer composition in an amount between 10 and 60 wt. %.

5. The RF filter housing according to claim 1, wherein the glass fibres are present in the polymer composition in an amount between 30 and 50 wt. %.

6. The RF filter housing according to claim 1, wherein the polymer composition comprises less than 5 wt. % of additives.

7. The RF filter housing according to claim 6, wherein the polymer composition consists of the polyethylene terephthalate, the glass fibres and less than 5 wt. % of the additives.

8. A base station for mobile telephones which comprises the RF filter housing according to claim 1.

* * * * *